(12) United States Patent
Maeda et al.

(10) Patent No.: US 8,578,206 B2
(45) Date of Patent: Nov. 5, 2013

(54) DISK CONTROLLER AND DISK CONTROL METHOD

(75) Inventors: Chikashi Maeda, Kawasaki (JP); Mikio Ito, Ota (JP); Hidejirou Daikokuya, Kawasaki (JP); Kazuhiko Ikeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 44 days.

(21) Appl. No.: 12/816,886

(22) Filed: Jun. 16, 2010

(65) Prior Publication Data

US 2010/0325478 A1    Dec. 23, 2010

(30) Foreign Application Priority Data

Jun. 19, 2009   (JP) ................................. 2009-146025

(51) Int. Cl.
*G06F 11/00* (2006.01)
(52) U.S. Cl.
USPC ............................ 714/6.22; 714/4.1; 714/6.21
(58) Field of Classification Search
USPC ......................................... 714/4.1, 6.21, 6.22
See application file for complete search history.

(56) References Cited

U.S. PATENT DOCUMENTS

| | | | |
|---|---|---|---|
| 6,353,895 B1 * | 3/2002 | Stephenson | 714/5.11 |
| 6,892,276 B2 * | 5/2005 | Chatterjee et al. | 711/114 |
| 7,389,379 B1 * | 6/2008 | Goel et al. | 711/112 |
| 8,055,938 B1 * | 11/2011 | Chatterjee et al. | 714/6.24 |
| 2006/0112302 A1 * | 5/2006 | Cherian | 714/6 |
| 2008/0104347 A1 | 5/2008 | Iwamura et al. | |

FOREIGN PATENT DOCUMENTS

| | | |
|---|---|---|
| JP | 11-510292 | 7/1999 |
| JP | 2008-134987 | 6/2008 |
| WO | 97/22931 | 6/1997 |

* cited by examiner

*Primary Examiner* — Charles Ehne
(74) *Attorney, Agent, or Firm* — Staas & Halsey LLP

(57) ABSTRACT

A disk controller for controlling disk devices for storing redundant data distributed thereacross, the disk devices providing a logical volume, the disk devices including pool volumes allocatable to one of the logical volume. The disk controller includes a memory for storing information indicating a relationship between the pool volumes and the logical volume; and a processor for performing data reconstruction in accordance with a failure of the disk devices, a process of the data reconstruction, the processor being configured to detect an error in a part of the pool volumes included in the other disk devices when reading data from the pool volumes included in the other disk devices, determine whether the detected pool volume is allocated to the logical volume in reference to the information, and initialize the part of the detected pool volume when the detected pool volume is unallocated to the logical volume.

11 Claims, 13 Drawing Sheets

| OFFSET | BYTE 0 | BYTE 1 | BYTE 2 | BYTE 3 |
|---|---|---|---|---|
| 0000 | SLU Number | | ... | |
| 0004 | SLU LBA (Max 512TB) | | | |

| OFFSET | BYTE 0 | BYTE 1 | BYTE 2 | BYTE 3 |
|---|---|---|---|---|
| 0000 | OLU Number | | SLU Number | |
| 0004 | | | | |
| 0008 | ALLOCATED TPPS BITMAP (42BITS) | | | |
| 000C | | | | |
| 0010 | ... | | | |
| 0014 | | | | |

| OFFSET | BYTE 0 | BYTE 1 | BYTE 2 | BYTE 3 |
|---|---|---|---|---|
| 0000 | TPPE ENTRY | | | |
| 0004 | OFFSET IN TPPE | | | |

DISK CONTROLLER AND DISK CONTROL METHOD

CROSS-REFERENCE TO RELATED APPLICATIONS

This application is based upon and claims the benefit of priority of the prior Japanese Patent Application No. 2009-146025, filed on Jun. 19, 2009, the entire contents of which are incorporated herein by reference.

FIELD

The embodiments discussed herein are related to a disk controller and a disk control method.

BACKGROUND

A disk array system having a plurality of disk devices and a disk controller employs a RAID (Redundant Array of Inexpensive Disks) mechanism so as to prevent a data loss caused by a disk failure and to further enhance a processing performance. A system that employs the RAID mechanism is called a RAID system.

The RAID system breaks up data to the plural disk devices so as to ensure redundancy, except for "RAID 0" though.

If one of the disk devices forming a RAID group is disabled because of a failure, etc., and the redundancy is lost, a rebuilding process is performed such that the disabled disk device is replaced by a spare disk device and data is rebuilt on the spare disk device so as to restore redundancy.

The rebuilding process is performed so as to rebuild the data included in the disabled disk device in such a way that processes for reading data from a normal disk device for every certain processing unit and writing restored data to a Hot Spare Disk, i.e., the spare disk device, are repeated.

Incidentally, if troubles are detected in same blocks of disk drives of the number of more than a degree of redundancy during the process for reading data from a normal disk device, it becomes impossible to read data stored in the relevant block.

So as to continue the rebuilding process even in such a situation and explicitly indicate a data loss in the relevant block, the rebuilding process is continued after BAD data corresponding to the disk device of the detected trouble and the Hot Spare Disk is created and written to the relevant block.

The above BAD data is to explicitly indicate that the data in the relevant block on a volume (described later) is disabled because of some factor. Content of the BAD data is, e.g., in a state where data different from data at the beginning is written. If a host computer makes a request to read data and BAD data is included in a requested area, a BAD data reply is sent back to the host computer so that the host computer is aware of the failed request to read data. Thus, erroneous data is never used as it is.

Refer to Japanese Laid-open Patent Publication No. 2008-134987 and No. 11-510292.

A volume included in a RAID group is classified as an ordinary volume or a storage pool.

FIGS. 15A and 15B illustrates an ordinary volume and a storage pool.

If logical volumes 810 and 820 to be perceived by a host computer are made in the ordinary volume 800, a real area as large in capacity as the logical volumes 810 and 820 to be made is allocated onto the RAID group.

Each of real areas 800a and 800b in the ordinary volume 800 illustrated in FIG. 15A is an object area of a formatting process, a rebuilding process, etc. to be performed.

As illustrated in FIG. 15A, the real area 800a in the ordinary volume 800 is allocated to the logical volume 810 of a logical volume name of Vol#0. Further, the real area 800b in the ordinary volume 800 is allocated to the logical volume 820 of a logical volume name of Vol#1.

In the ordinary volume 800, as described above, the real areas to be used as the logical volumes 810 and 820 equal the real areas corresponding to the areas 800a and 800b perceived by the host computer.

Thus, it is enough to perform the formatting process only for a relevant area (perceived by the host computer) on a real area so as to make a logical volume, and to perform the rebuilding process described earlier only for the relevant area.

Meanwhile, in the storage pool 900, no real area is allocated when logical volumes 910 and 920 are made. At a time when the host computer practically makes an I/O request, a real area is allocated each time only to an I/O-requested area.

Thus, the whole storage pool 900 is made an object area of the formatting process, the rebuilding process, etc.

As illustrated in FIG. 15B, areas 900a, 900b and 900c into which the storage pool 900 is divided on a block-by-block basis of a certain size are allocated to the logical volume 910 of a logical volume name of Vol#2. Further, areas 900d, 900e and 900f into which the storage pool 900 is divided on a block-by-block basis of a certain size are allocated to the logical volume 920 of a logical volume name of Vol#3.

In the storage pool, differently from in the ordinary volume as described above, a real area to be used for a logical volume does not equal a real area which corresponds to an area perceived by the host computer. In other words, the storage pool includes an area that could possibly be used for a logical volume and is not perceived by the host computer yet.

If the rebuilding process is performed in the storage pool 900, BAD data can possibly occur in a real area that is not allocated yet in some cases during the rebuilding process.

In this case, upon allocating a new real area onto the logical volume, the host computer ends up allocating an area including the BAD data. Thus, there is a problem in that the area to be used since then ends up in a state where a trouble already exists in the area.

SUMMARY

According to an aspect of the invention, a disk controller for controlling a plurality of disk devices for storing redundant data distributed thereacross, the disk devices providing at least one logical volume across the disk devices, the disk devices including a plurality of pool volumes allocatable to one of the logical volumes in accordance with an access from a host to the logical volume, includes a memory for storing information indicating a relationship between the pool volumes and the logical volume so as to allocate the pool volumes to the logical volume; and a processor for performing data reconstruction in accordance with a failure of the disk devices, a process of the data reconstruction including reading data from a plurality of the pool volumes included in the other disk devices, the processor being configured to detect an error in a part of the pool volumes included in the other disk devices when the processor reads data from the pool volumes included in the other disk devices, determine whether the pool volume in which the error is detected is allocated to the logical volume or not in reference to the information, and initialize the part of the pool volume in which the error is detected when the pool volume in which the error is detected is unallocated to the logical volume.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates a TPPS management table;

FIG. 10 illustrates a TPPE management table;

FIG. 11 illustrates an OLU management table;

DESCRIPTION OF EMBODIMENTS

Embodiments will be explained in detail with reference to the drawings hereafter.

A disk controller of a first embodiment will be explained first, and a disk controller of a second embodiment will be more specifically explained, then.

<First Embodiment>

Figure 1:
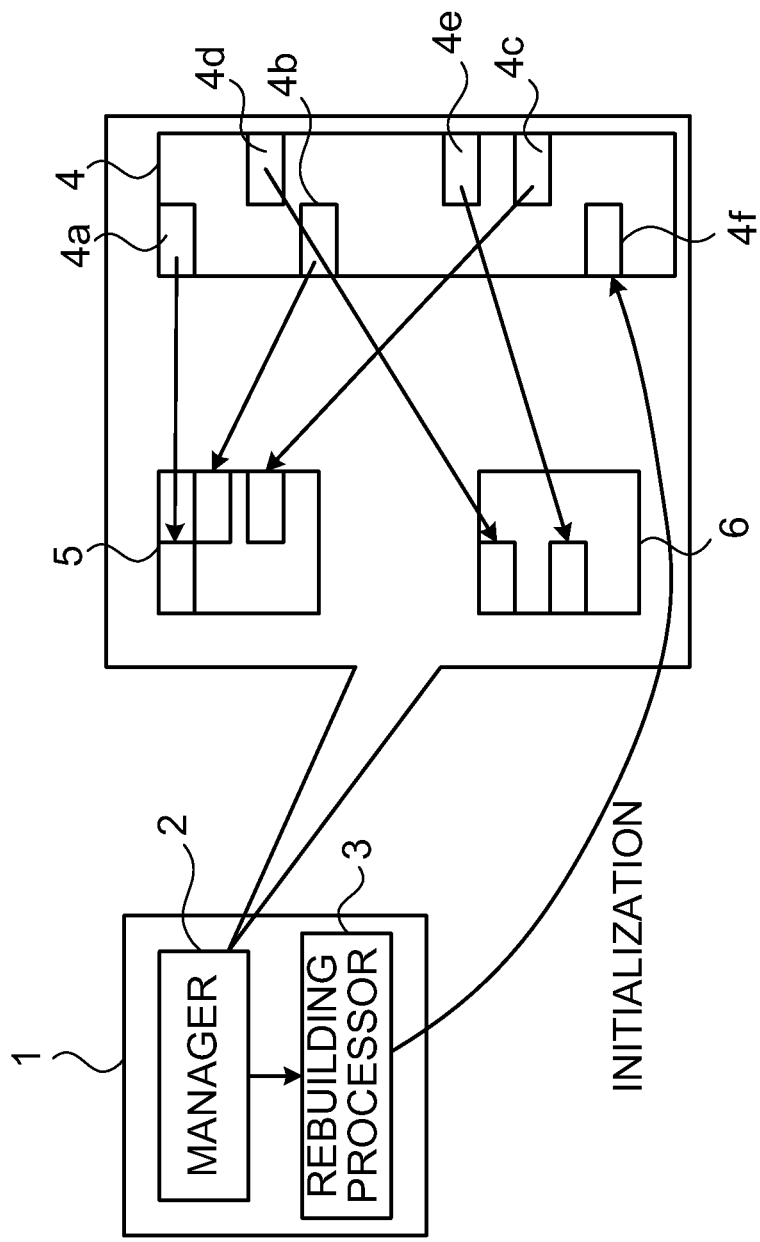
FIG. 1 illustrates an outline of a disk controller of an embodiment.

FIG. 1 illustrates an outline of the disk controller of a first embodiment. The disk controller 1 of the embodiment has a manager 2 and a rebuilding processor 3.

The manager 2 manages a logical volume provided in a storage pool implemented by a plurality of disk devices which manage data made redundant in a distributed manner.

In FIG. 1, a storage pool 4 implemented by a plurality of disk devices is provided. The manager 2 manages logical volumes 5 and 6 in which a real area of the storage pool 4 is divided by certain managed units (pool volumes) 4a-4d into managed unit areas and the real area of the storage pool 4 is allocated to the respective managed unit areas.

The rebuilding processor 3 performs a rebuilding process for ensuring redundancy of data in accordance with a failure of a certain one of the disk devices which implement the storage pool 4.

The rebuilding process is, to put it specifically, to restore data in a disk device in failure for respective managed unit areas into which a storage area of the disk device is divided by certain managed units by using data in a disk device other than the disk device in failure, and to write the restored data to a spare disk prepared in advance so as to rebuild the data on the spare disk.

Incidentally, the storage pool 4 illustrated in FIG. 1 includes a managed unit (pool volume) 4f that could possibly be used for a logical volume and is not perceived yet by the host computer.

According to the rebuilding process, the rebuilding processor 3 rebuilds data for every real area on the disk that can be possibly allocated in the future such as the managed unit 4f.

Upon detecting a trouble in an area of the storage pool 4, then, the rebuilding processor 3 identifies whether a logical volume is allocated to the area.

In other words, the rebuilding processor 3 identifies whether a situation stands in which data of uncertain values is created in an area to which neither the logical volumes 5 nor 6 is being allocated.

The situation in which data of uncertain values is created is, e.g., a situation in which troubles are detected in same managed units of disk drives of the number of more than a degree of redundancy. In this case, it becomes impossible to read data stored in the relevant managed unit.

Upon detecting a trouble in an area of the storage pool to which no logical volume is allocated, the rebuilding processor 3 initializes the area.

As the area is initialized, a situation in which data of uncertain values is created in a not-allocated-yet real area can be certainly prevented. An environment can thereby be assured for using the relevant area from the host computer without receiving an instruction for overwriting to the area.

Incidentally, it is preferable for the rebuilding processor 3, upon detecting a trouble in one of the managed units 4a-4e to which the logical volumes of the storage pool 4 are allocated by means of the identification described above, to write data indicating that the relevant managed unit is disabled.

Thus, it can be explicitly indicated that the data in the relevant managed unit is unusable.

<Second Embodiment>

A disk controller according to a second embodiment will be explained in detail with reference to the drawings regarding an exemplary disk array system that implements a RAID function "RAID 5", as follows.

Figure 2:
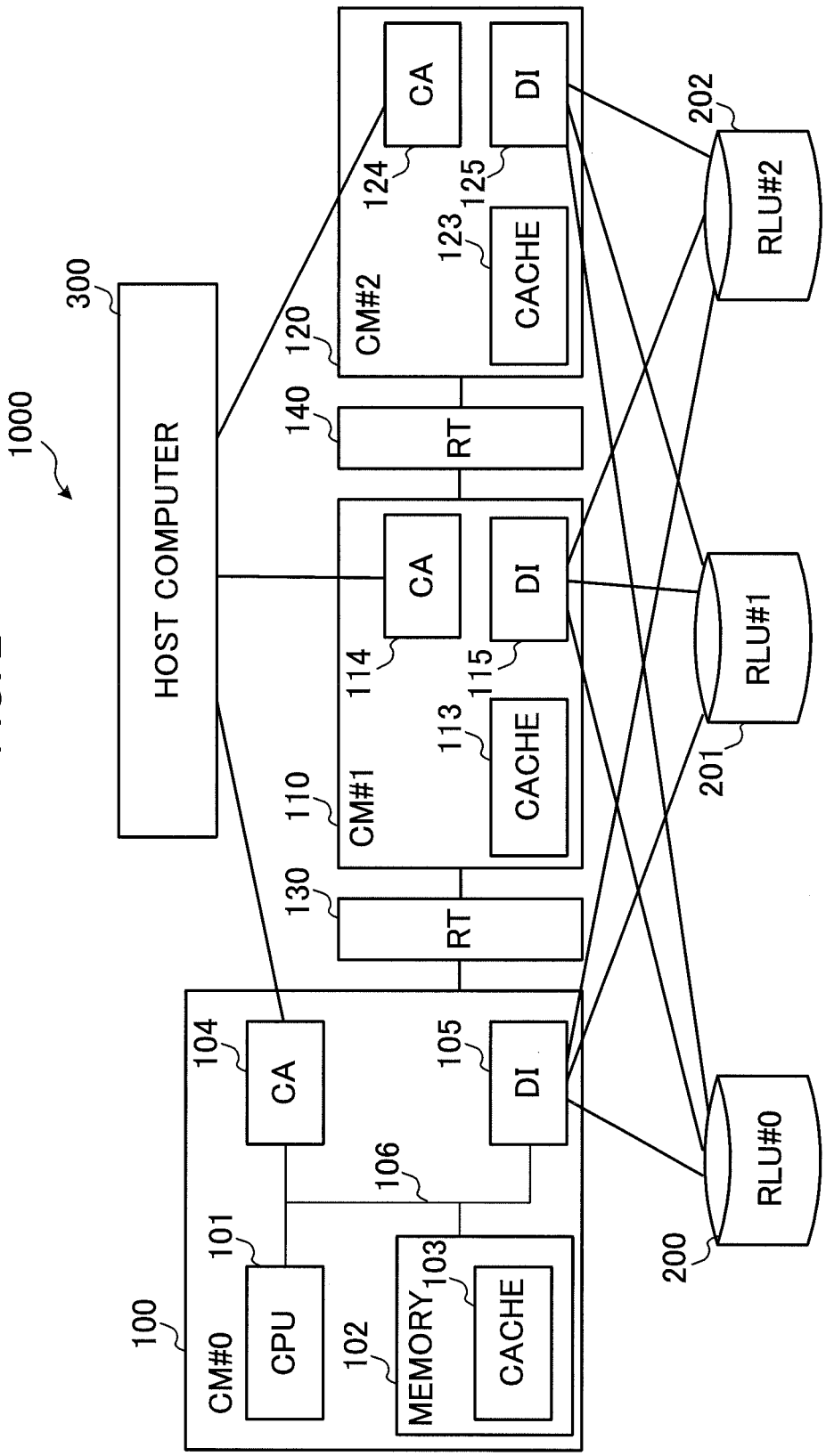
FIG. 2 illustrates a system of the embodiment.

FIG. 2 illustrates a system of the embodiment.

A RAID system 1000 of the embodiment is constituted by logical disks 200, 201 and 202 included in a disk array that implements the RAID function "RAID 5" and a host computer 300. The logical disks are connected to the host computer 300 through control modules (CM: Control Module) 100, 110 and 120.

Each of the logical disks 200, 201 and 202 has one or a plurality of physical disk(s).

The logical disks 200, 201 and 202 are identified by means of disk names "RLU#0", "RLU#1" and "RLU#2", respectively.

Further, the control modules 100, 110 and 120 are identified by means of module names "CM#0", "CM#1" and "CM#2", respectively.

The control modules 100 and 110 are connected to each other through a router (RT) 130. Further, the control modules 110 and 120 are connected to each other through a router (RT) 140.

Each of the control module 100, 110 and 120 is a disk controller which carries out an I/O request acquired from the host computer 300 and performs a rebuilding process such that, if a portion of a managed disk array is in failure, data in the disk array is rebuilt on a hot spare disk.

Further, they form a redundant configuration such that, if one of the control modules is in failure, another one of the control modules backs the failed control module up.

A hardware configuration of the control module 100 will be explained.

The whole control module 100 is controlled by a CPU (Central Processing Unit) 101. To the CPU 101, a memory 102, a channel adapter 104, a disk interface 105, etc. are connected through a bus 106.

The CPU 101 and the memory 102 are backed up by a battery which is not illustrated, and a portion of the memory is used as a cache.

The channel adapter 104 is a circuit which works as a host interface to be connected with the host computer 300.

The disk interface 105 is a circuit which works as a disk interface to be connected with a disk device.

Incidentally, the control modules 110 and 120 are similarly configured, and have caches 113 and 123, channel adapters 114 and 124, and disk interfaces 115 and 125, respectively.

A configuration of the disk device will be explained.

Figure 3:
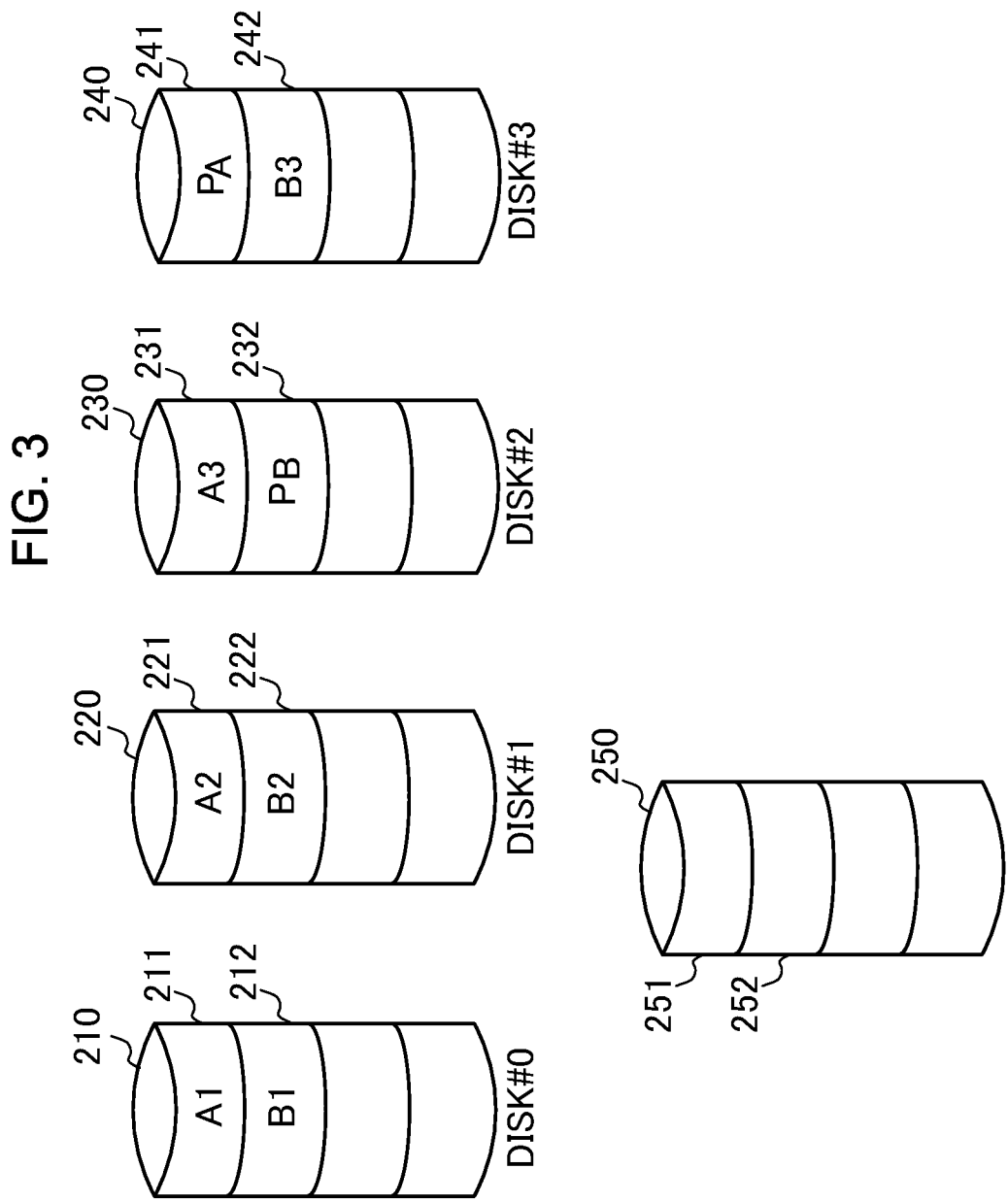
FIG. 3 illustrates an exemplary configuration of a disk device of the embodiment.

FIG. 3 illustrates an exemplary configuration of the disk device of the embodiment.

According to the example illustrated in FIG. 3, the RAID function "RAID 5" is implemented by four disk devices which are disks 210, 220, 230 and 240 and a hot spare disk 250, i.e., a spare disk device.

The disks 210, 220, 230 and 240 are identified by means of disk names disk#0, disk#1, disk#2 and disk #3, respectively.

In each of the disks 210, 220, 230 and 240, data divided by a stripe size and a parity code produced from the divided data are stored in a same stripe.

Data A is divided, e.g., into data A1, data A2 and data A3. The data A1, A2 and A3 and a parity code PA are stored in a block 211 of the disk 210, a block 221 of the disk 220, the block 231 of the disk 230 and the block 241 of the disk 240, respectively.

Data B is similarly divided into data B1, data B2 and data B3. The data B1, B2 and B3 and a parity code PB are stored in blocks 212, 222, 242 and 232, respectively.

Such a configuration enables, if one of the disk devices is in failure, data in the failed disk device to be restored from the divided data and the parity data in the same stripe stored in the other normal disk devices.

Further, stripe areas on the side of the hot spare disk 250 which correspond to the data A and the data B are supposed to be blocks 251 and 252, respectively.

The managed unit areas, i.e., processing units for the rebuilding process, are areas into which an area on the disk is divided by a certain unit, and each one of the areas is called a TPPS (Thin Provisioning Pool Slice) (which corresponds to the managed units 4a-4f described earlier). One TPPS is, e.g., 32 MB in capacity.

Incidentally, the RAID system 1000 works the RAID group as a storage pool.

In the storage pool, all real areas on the disks 210, 220, 230 and 240 are made object areas of the rebuilding process. In the storage pool, as described above, no real area is allocated when the logical volume is made, and at a time when the host computer practically makes an I/O request, a real area is allocated each time only to an I/O-requested area.

In the storage pool, real areas are allocated on a TPPS-by-TPPS basis.

Functions of the control module 100 will be explained.

Figure 4:
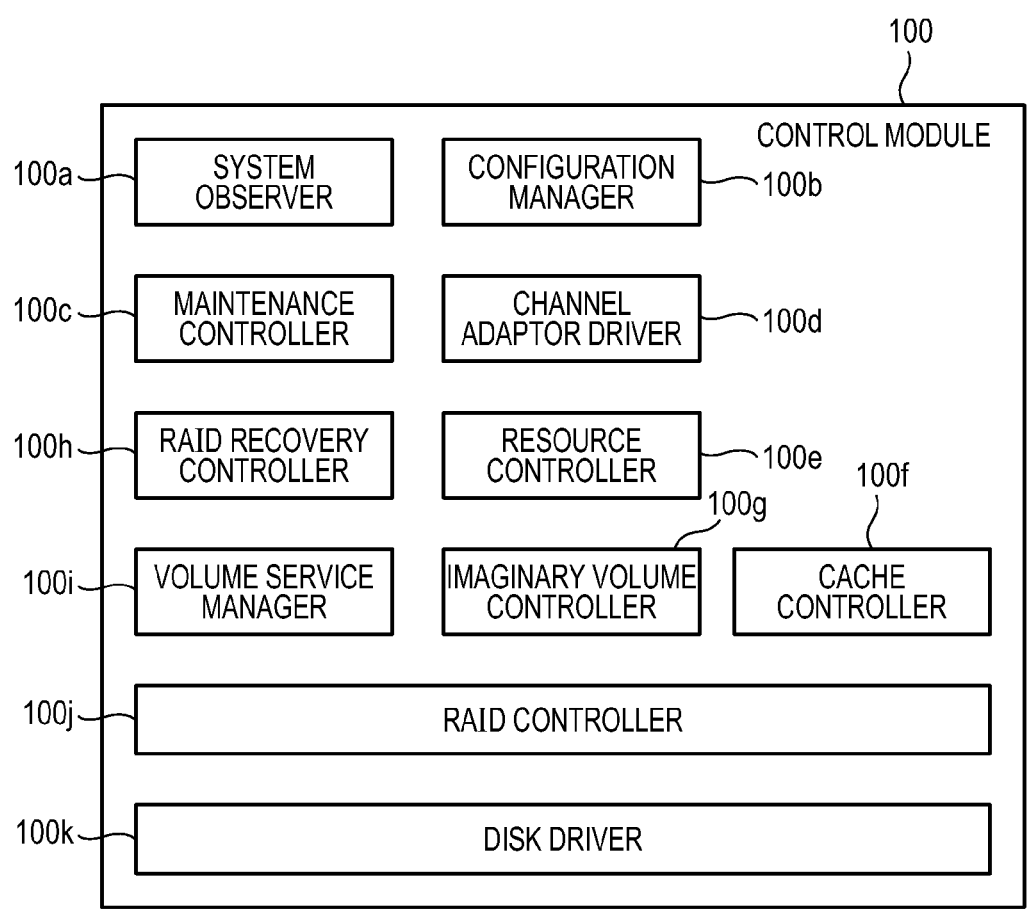
FIG. 4 is a block diagram for illustrating functions of a control module.

FIG. 4 is a block diagram for illustrating the functions of the control module.

The control module 100 has a system observer 100a, a configuration manager 100b, a maintenance controller 100c, a channel adaptor driver 100d, a resource controller 100e, a cache controller 100f, a storage pool controller 100g, a RAID recovery controller 100h, a volume service manager 100i, a RAID controller 100j and a disk driver 100k.

The system observer 100a synchronizes in the control module 100 events notified by an observing module that is not illustrated such as alarms regarding the power supply or temperature, a report on parts mounting, etc., and activates a predetermined process.

The configuration manager 100b manages a configuration and a state of the control module 100 so as not to cause inconsistency in the whole control module 100. Further, the configuration manager 100b manages to maintain predetermined information even if the control module 100 is powered off.

Further, the configuration manager 100b synchronizes information in the control module 100 or saves information into the memory 102 with a change or initialization of the configuration directed by the maintenance controller 100c or a change of the state caused by an internal error as triggers.

The maintenance controller 100c works to receive a command from CGI. Further, the maintenance controller 100c manages firmware of the control module 100.

The channel adaptor driver 100d controls the channel adapter 104. The channel adaptor driver 100d receives an I/O request from the host computer 300 and communicates with a thread layer in the control module 100.

The resource controller 100e enforces mutual exclusion to the I/O of the host computer 300 and observes the I/O.

To put it specifically, the resource controller 100e enforces EXTENT mutual exclusion, volume mutual exclusion, clock access control, sense management control, mutual exclusion among subsystem commands, etc.

The cache controller 100f manages the cache 103 to be used as the I/O for reading data from the disks 210, 220, 230 and 240. Further, the cache controller 100f manages the cache 103 to be used as the I/O for writing data to the disks 210, 220, 230 and 240.

The cache controller 100f makes a Hit/Miss judgment of data to the I/O, and schedules Staging, WriteBack, etc.

The storage pool controller 100g manages allocation of TPPE (Thin Provisioning Pool Element)/TPPS of the storage pool and an association with the logical volume. A method for managing them will be described later.

The RAID recovery controller 100h controls allocation of the hot spare disk 250 and a state transition of the RAID group in case of failures or dynamic maintenance of the disks 210, 220, 230 and 240.

The volume service manager 100i controls the rebuilding process and performs copy-back control in coordination with the RAID recovery controller 100h and a RAID layer.

The copy-back control is a process for writing redundant data written in the hot spare disk 250 to another disk which is not illustrated.

The RAID controller 100j is a layer which controls data I/O to and from the disks 210, 220, 230 and 240 at respective RAID levels.

The disk driver 100k performs communication control to the disks 210, 220, 230 and 240.

The rebuilding process will be briefly explained.

FIGS. 5-8 illustrate the rebuilding process of the embodiment.

Figure 5:
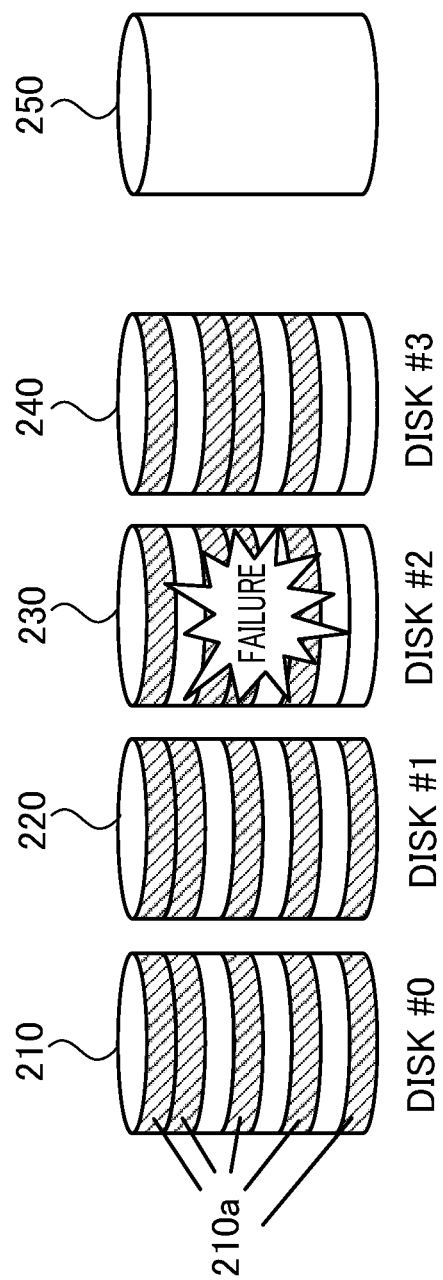
FIG. 5 illustrates a rebuilding process of the embodiment.

In FIG. 5, a previously allocated area 210a to which data of the disks 210, 220, 230 and 240 has been allocated is indicated by diagonal hatching.

If the disks 210, 220, 230 and 240 are in normal states and an I/O request from the host is received, the RAID controller 100j performs an ordinary I/O request process and sends a reply back to the host computer 300.

Assume that a disk failure occurs in the RAID group worked as the storage pool. If a failure of one of the disks 210, 220, 230 and 240 is detected, the RAID controller 100j performs a rebuilding process. Assume that the disk 230 is in failure in FIG. 5.

At this time, the configuration manager 100b allocates the hot spare disk 250 to a substitute of the disk 230 being in failure, and sends a recovery instruction to the RAID controller 100j.

Upon receiving the recovery instruction, the RAID controller 100j starts the rebuilding process.

To begin with, the RAID controller 100j reads divided data in the disks 210, 220 and 240 being normal for every area determined by the volume service manager 100i in which the rebuilding process is once performed (called "rebuilding unit area" hereafter). Then, the RAID controller 100j restores data in the rebuilding unit area of the disk 230 being in failure.

Figure 6:
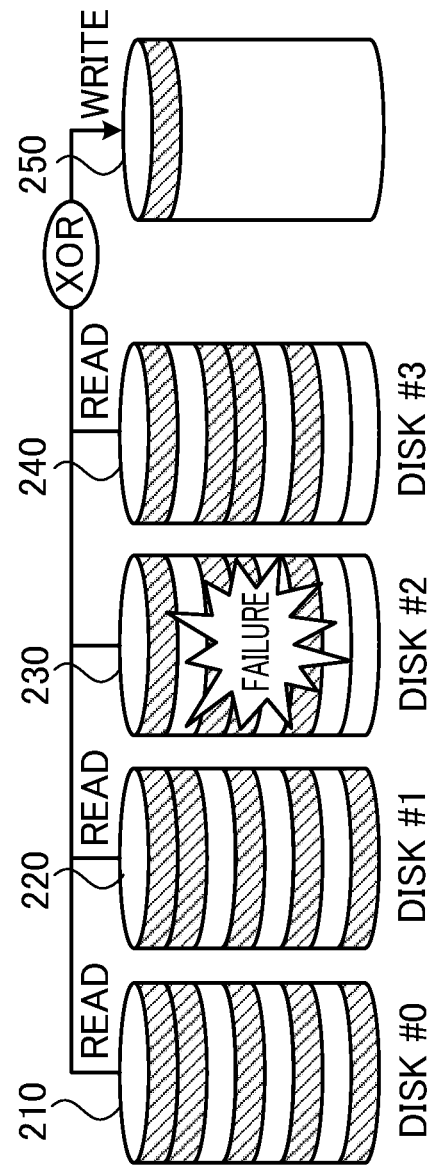
FIG. 6 illustrates the rebuilding process of the embodiment.

As illustrated in FIG. 6, the RAID controller 100j reads data from the disks 210, 220 and 240, and makes an XOR (exclusive logical sum) of the read data.

The XOR-summed data is written to the hot spare disk 250 and the data is rebuilt on the hot spare disk 250.

After the rebuilding process finishes in the rebuilding unit area, a "rebuilding process performing state" of rebuilding management information regarding the relevant rebuilding unit area is set to rebuilding process completion.

If a medium error area 210b is detected in one TPPS of the disk 210 during the rebuilding process and the TPPS and the disk 230 keep being redundant to each other, the state of things already has no redundancy.

At this time, the RAID controller 100j performs a BAD data creation identifying process.

As a result of this process, it is known whether the medium error area 210b is allocated to the logical volume. The BAD data creation identifying process will be described later.

Figure 7:
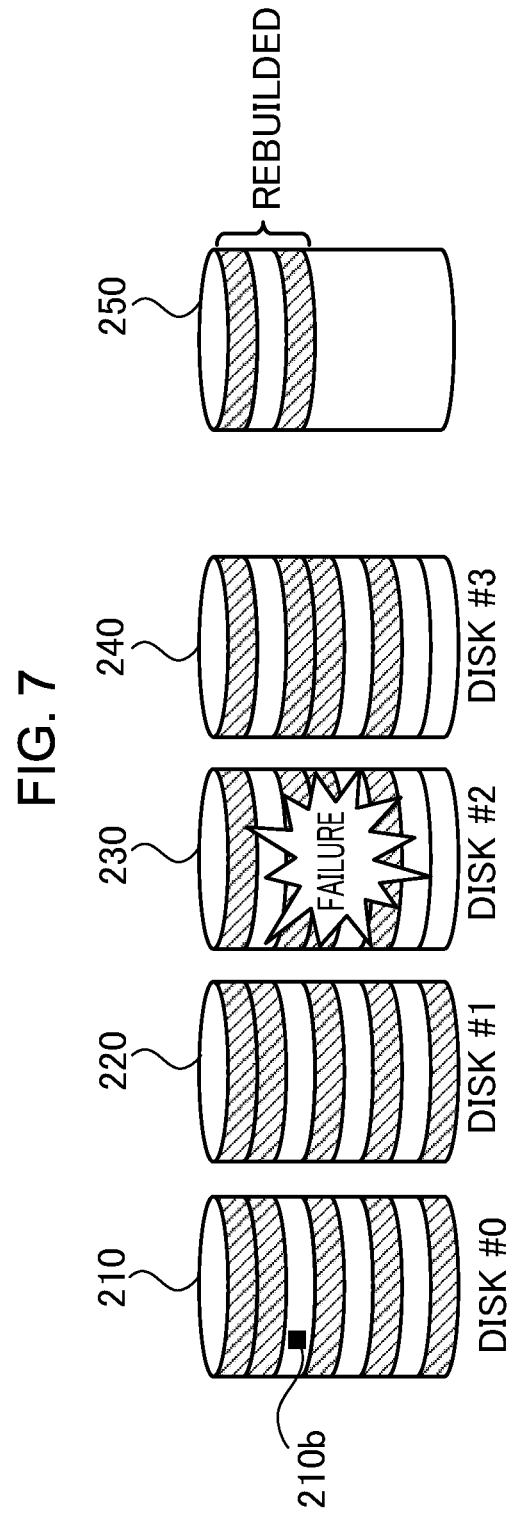
FIG. 7 illustrates the rebuilding process of the embodiment.
Figure 8:
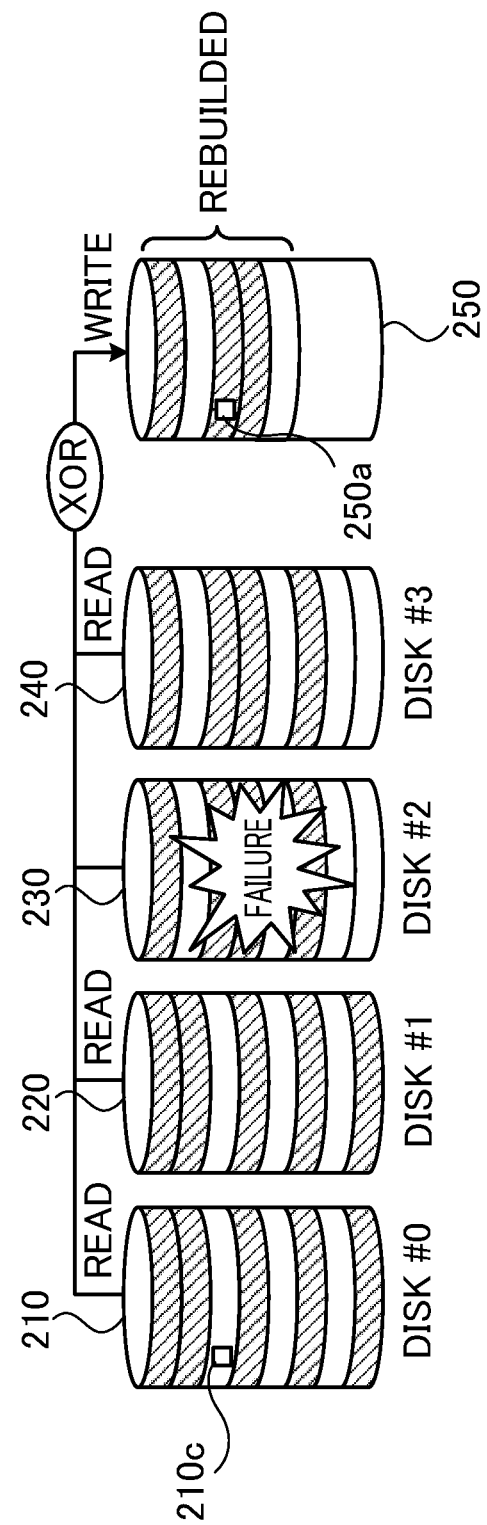
FIG. 8 illustrates the rebuilding process of the embodiment.

In FIG. 7, the medium error area 210b is in an area to which no data is allocated. In this case, a formatting process is performed for the medium error area 210b. The formatting process is, for example, that the RAID controller 100j performing a process for writing zero data to the area to which no data is allocated. The medium error area 210b is thereby made a previously formatted area 210c as illustrated in FIG. 8, and BAD data can be prevented from being produced in the area to which no data is allocated. In addition, before the formatting process, one of the elements included in the control module 100 may request one of the disk devices including the area to perform a process for repairing the area so as to cause the area to be writable and readable. The process for repairing the area is, for example, a reassign block process.

Further, as an area in the hot spare disk 250 which corresponds to the medium error area 210b (corresponding area) is a previously allocated area, BAD data is written to that area. As illustrated in FIG. 8, the corresponding area in the hot spare disk 250 is made BAD data 250a.

Then, the rebuilding process continues.

A method for identifying whether data is allocated to the medium error area 210b will be explained.

The RAID controller 100j asks the storage pool controller 100g whether data is allocated to the TPPS of the medium error area 210b during the BAD data creation identifying process.

The storage pool controller 100g identifies whether data is allocated to the TPPS by using three kinds of tables provided in the cache 103 illustrated below. Then, the RAID controller 100j performs the formatting process described earlier on the basis of an identified result.

FIG. 9 illustrates a TPPS management table.

The TPPS management table 103a is a table for managing the TPPS on a TPPS-by-TPPS basis, and a plurality of the TPPS management tables is provided.

FIG. 9 illustrates one TPPS management table 103a which corresponds to one TPPS.

The TPPS is provided with columns of offset, byte 0, byte 1, byte 2 and byte 3.

To the byte 0 and byte 1 columns of an offset "0000", "SLU (Shared Logical Unit) Number" is set which indicates a logical volume number managed in the control module 100.

To the byte 3 column of the offset "0000" and the byte 1-3 columns of an offset "0004", "SLU LBA (Logical Block Address)" is set which indicates an address on a real area as SLU. Incidentally, an upper limit of "SLU LBA" is 512 TB.

Further, the cache 103 is provided with a TPPE management table and an OLU (Open Logical Unit) management table for specifying the TPPS in accordance with a request from the host computer 300.

FIG. 10 illustrates the TPPE management table.

The TPPE management table 103b is provided with columns of offset, byte 0, byte 1, byte 2 and byte 3.

To the byte 0 and byte 1 columns of an offset "0000", "OLU Number" is set which indicates a logical volume number of the allocated area to be perceived by the host computer 300.

To the byte 0 and byte 1 columns of the offset "0000", "SLU Number" is set.

To the byte 0-3 columns of an offset "0008" and the byte 0-3 columns of an offset "000C", a bitmap (bit string) of 42 bits for identifying a previously allocated or not-allocated-yet TPPS is set. That is, a bitmap for identifying 42 TPPS areas is set to one TPPE management table 103b.

FIG. 11 illustrates the OLU management table.

The OLU management table 103c is provided with columns of offset, byte 0, byte 1, byte 2 and byte 3.

To the byte 0-3 columns of an offset "0000", "TPPE entry", i.e., information for specifying the TPPE management table 103b is set.

To the byte 0-3 columns of an offset "0004", "offset in TPPE", i.e., information for specifying an offset number in a specified TPPE management table 103b is set.

As the TPPS management table 103a, the TPPE management table 103b and the OLU management table 103c described above are provided, it can be certainly identified whether data is allocated to the TPPS.

To put it specifically, if the host computer 300 requests an I/O of data, the storage pool controller 100g refers to the OLU management table 103c and specifies the TPPE management table 103b and an offset in the TPPE management table 103b corresponding to the requested area. Then, the storage pool controller 100g refers to "SLU LBA" of the relevant TPPS management table 103a through the relevant TPPE management table 103b, and can thereby specify LBA as relevant SLU.

The rebuilding process of the control module 100 will be explained in detail.

Figure 12:
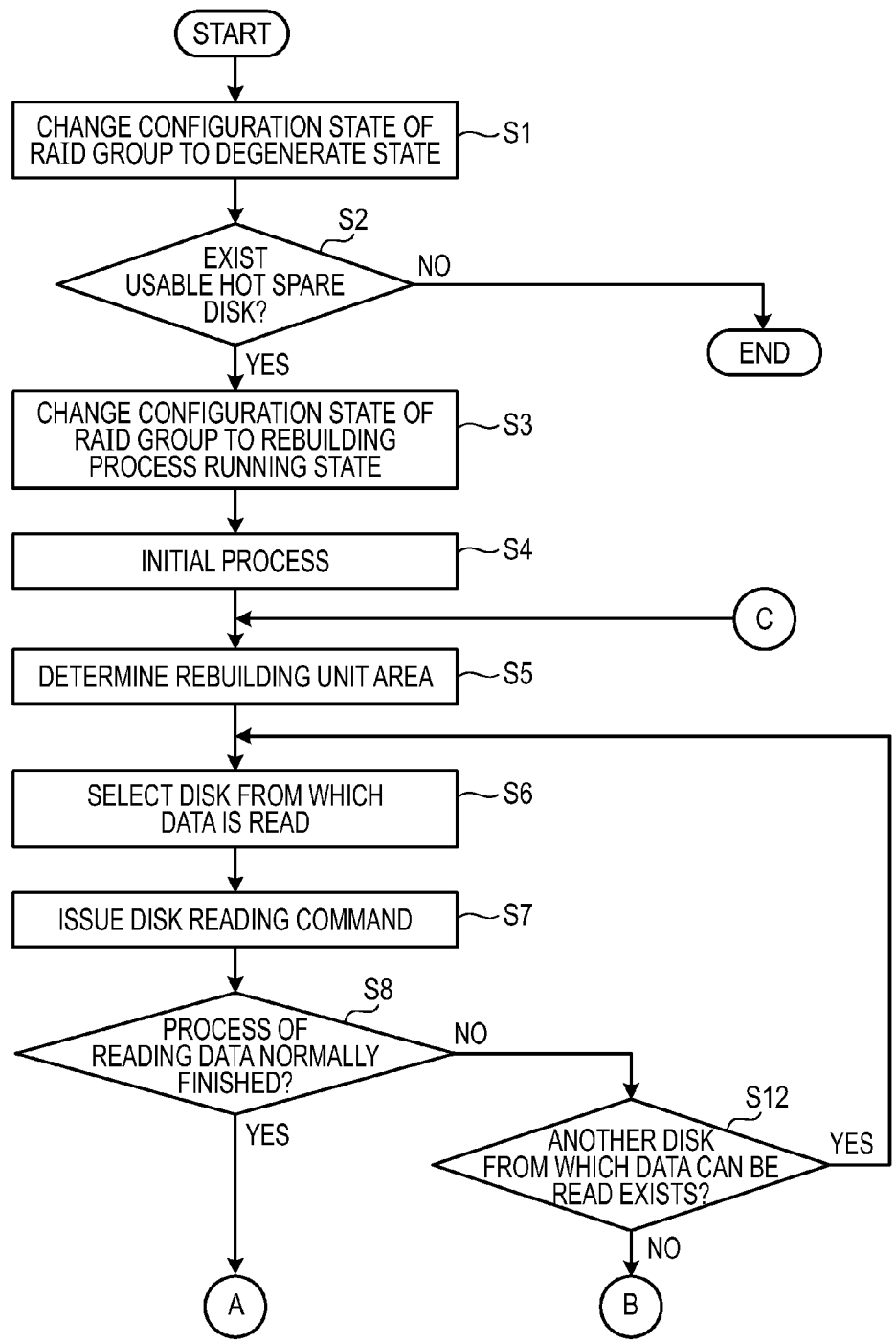
FIG. 12 illustrates the rebuilding process of the control module.
Figure 13:
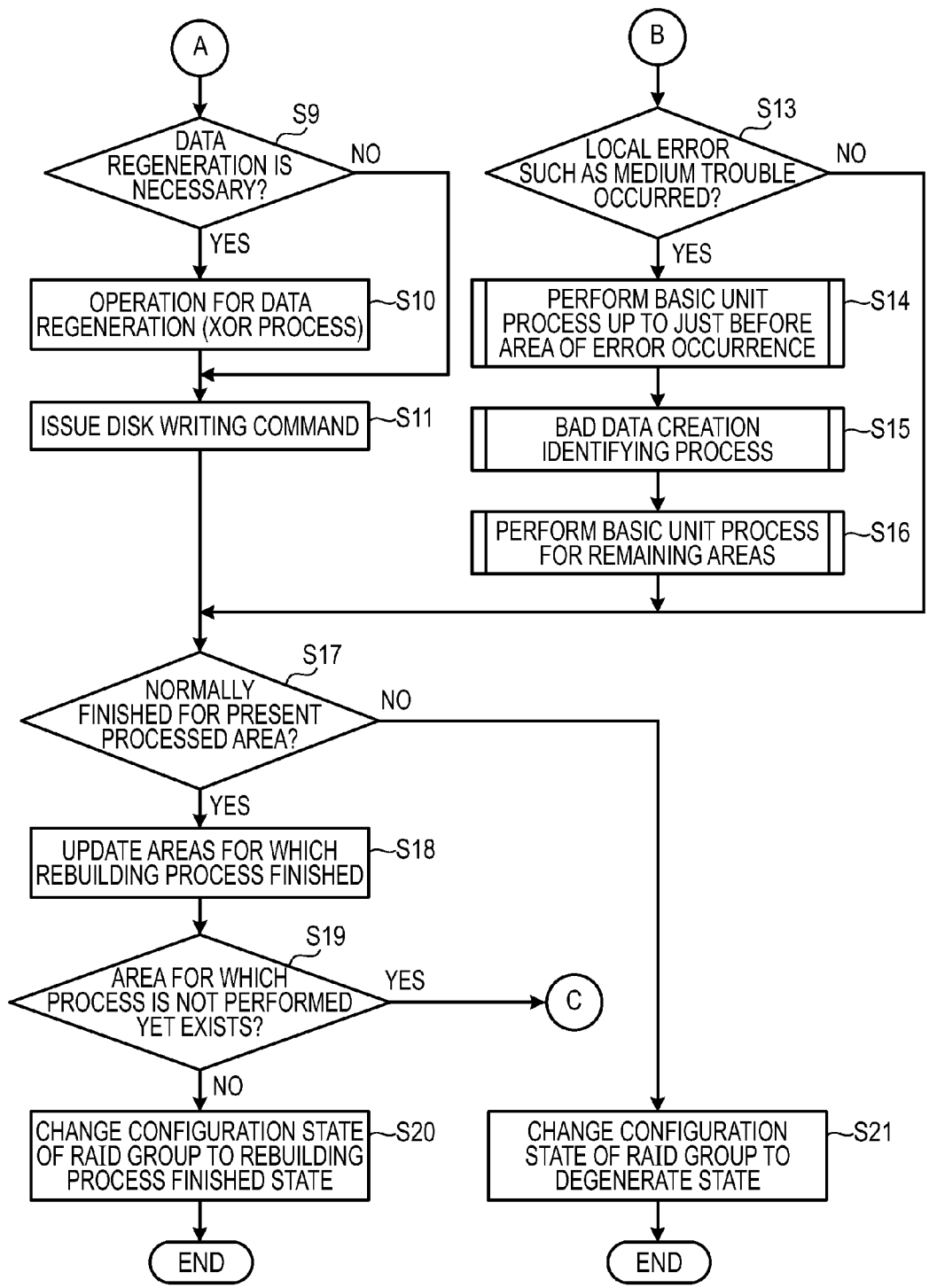
FIG. 13 illustrates the rebuilding process of the control module.

FIGS. 12 and 13 are flowcharts for illustrating the rebuilding process of the control module 100.

If a failure occurs in a disk, the configuration manager 100b changes a configuration state of the RAID group to a degenerate state (step S1).

The RAID recovery controller 100h thereby identifies whether a usable hot spare disk 250 exists (step S2).

If no usable hot spare disk 250 exists (No of step S2), the process ends.

If a usable hot spare disk 250 exists (Yes of step S2), the RAID recovery controller 100h informs the configuration manager 100b of the existence. The configuration manager 100b thereby changes the configuration state of the RAID group to a rebuilding process active state (step S3).

The RAID recovery controller 100h thereby performs a following process (1)-(4) (initial process) along with the volume service manager 100i (step S4).

(1) Change a configuration state of the hot spare disk 250.
(2) Check the state of the RAID group.
(3) Check a state of the disk to be an object of the rebuilding process.
(4) Make an initial setting for starting the rebuilding process.

Then, the volume service manager 100i determines a rebuilding unit area in which data in the disks 210, 220, 230 and 240 is rebuilt (step S5).

Then, the RAID controller 100j selects a disk from which data is read from the disks 210, 220, 230 and 240 (step S6).

Then, the RAID controller 100j issues a disk reading command to the selected disk (step S7). The disk driver 100k informs the selected disk of the issued command.

Data is thereby read from the selected disk.

Then, the RAID controller 100j identifies whether the process of reading data from the disk has normally finished on the basis of a report received from the selected disk through the disk driver 100k (step S8).

If the process for reading data from the disk has normally finished (Yes of step S8), the RAID controller 100j identifies whether data regeneration is necessary or not (step S9). For example, the way to identify whether data regeneration is necessary or not is that manager 2 checks state of the RAID group. If data stored on a RAID group is mirroring data, the data regeneration is not necessary. If data stored on a RAID group is not mirroring data, the data regeneration is necessary.

If the data regeneration is not necessary (No of step S9), shift to a step S11.

Meanwhile, if the data regeneration is necessary (Yes of step S9), the RAID controller 100j performs an operation (XOR process) for the data regeneration (step S10).

Then, the RAID controller 100j issues a disk writing command (step S11). The disk driver 100k informs the hot spare disk 250 of the issued command. Data is thereby written to the hot spare disk 250. Then, shift to a step S17.

The process from the issuance of the disk reading command at the step S7 to the issuance of the disk writing command at the step S11 is called a basic unit process, hereafter.

Incidentally, if the process for reading data from the disk has not normally finished at the step S8 (No of step S8), the RAID controller 100j identifies whether another disk from which data can be read exists (step S12).

If another disk from which data can be read exists (Yes of step S12), shift to the step S6 and select the disk (step S6). Then, the process following the step S7 continues.

Meanwhile, no other disks from which data can be read exist (No of step 512), the RAID controller 100j identifies whether a local error such as a medium trouble has occurred to the disk for which the reading process has not normally finished (step S13). For example, the way to identify whether the local error has occurred to the disk or not is that the RAID controller 100j identifies whether when disk driver 100k read data stored from one of the disks 210, 220, 230 and 240, there is a managed unit area (TPPS) in which the disk driver 100k cannot read data or not, the storage pool controller 100g managing allocation of the managed unit area of the storage pool. If there is the managed unit area in which the disk driver 100k cannot read data, the local error has occurred to the disk. If there is not the managed unit area in which the disk driver 100k cannot read data, no local error has occurred.

Upon identifying no local error which has occurred (No of step S13), shift to the step S17.

Meanwhile, upon identifying a local error which has occurred (Yes of step S13), the RAID controller 100j performs the basic unit process up to a TPPS just before the TPPS of the error occurrence (step S14).

Then, the RAID controller 100j performs the BAD data creation identifying process for the TPPS of the error occurrence (step S15). This process will be described later.

Then, the RAID controller 100j performs the basic unit process for TPPS areas after the TPPS of the error occurrence (step S16).

Then, the volume service manager 100i identifies whether the rebuilding process has normally finished for the rebuilding unit area determined at the step S5 (step S17).

If the rebuilding process has normally finished for the present rebuilding unit area (Yes of step S17), the volume service manager 100i informs the configuration manager 100b of a request for updating areas for which the rebuilding process finished. The configuration manager 100b thereby updates the areas for which the rebuilding process finished (step S18).

Then, the volume service manager 100i identifies whether an area for which the rebuilding process is not performed yet exists (step S19).

If an area for which the rebuilding process is not performed yet exists (Yes of step S19), the process shifts to the step S5, and the volume service manager 100i determines a rebuilding unit area in which data is rebuilt for the area for which the rebuilding process is not performed yet. Then, the process following the step S6 continues.

Meanwhile, if no area for which the rebuilding process is not performed yet exists (No of step S19), the configuration manager 100b changes the configuration state of the RAID group to a rebuilding process finished state (step S20). Then, the process ends.

Meanwhile, if the rebuilding process has not normally finished for the present rebuilding unit area (No of step S17), the configuration manager 100b changes the configuration state of the RAID group to the degenerate state (step S21). Then, the process ends.

The BAD data creation identifying process will be explained.

Figure 14:
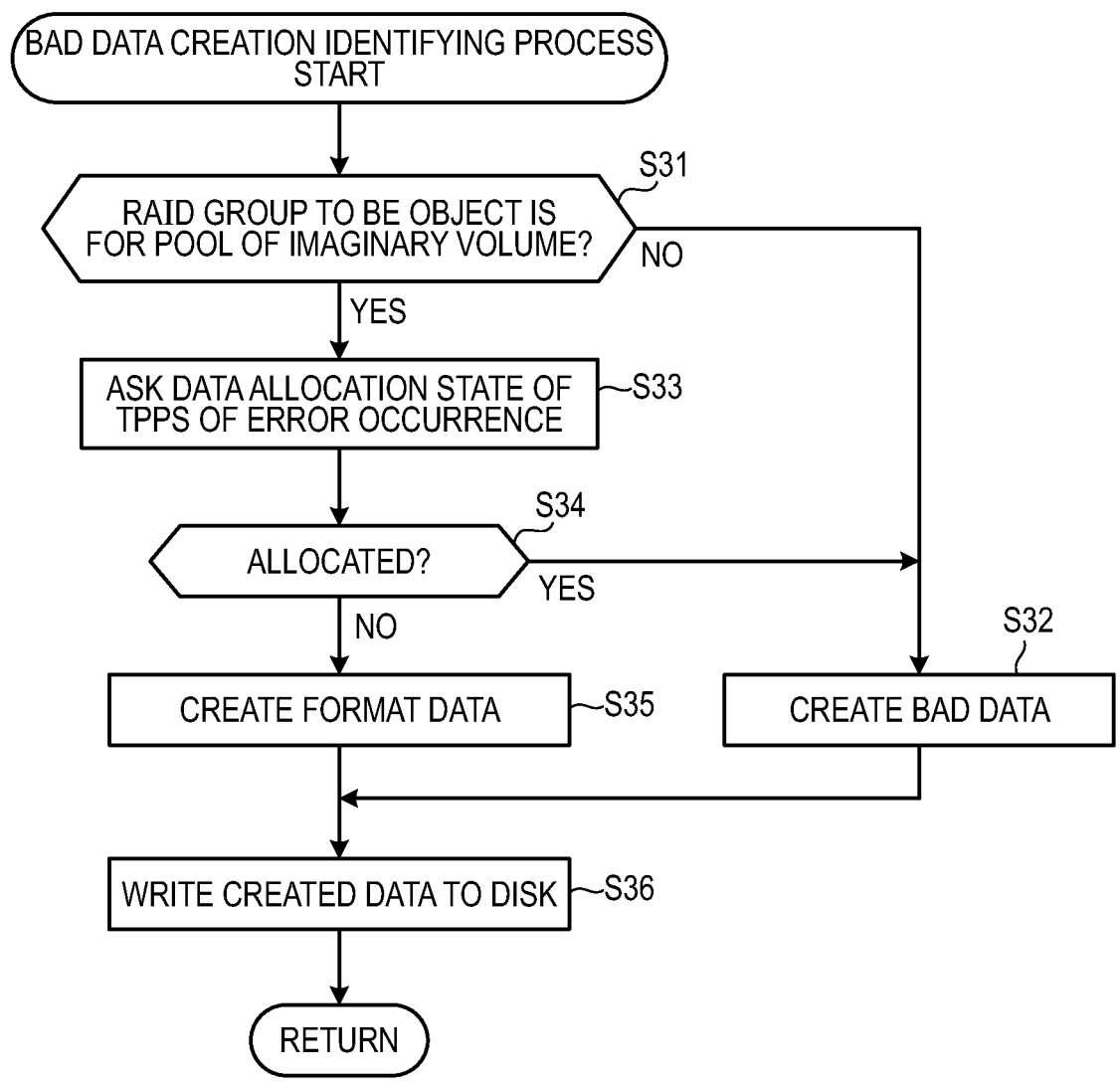
FIG. 14 illustrates a BAD data creation identifying process.
Figure 15A:
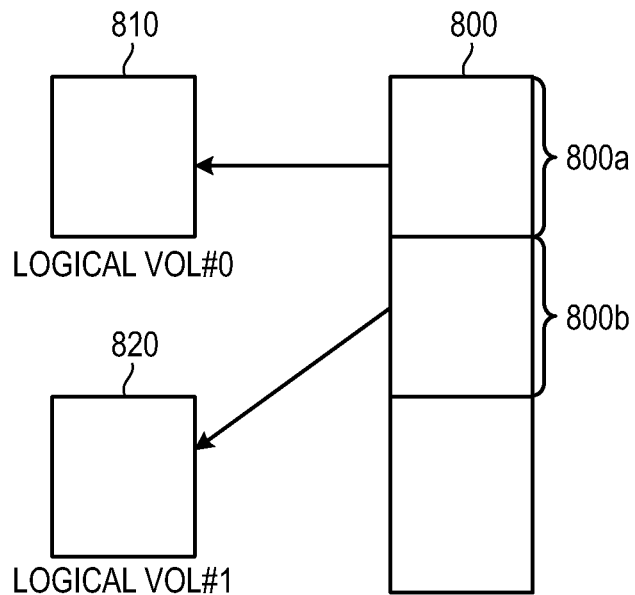
FIGS. 15A and 15B illustrates an ordinary volume and a storage pool.
Figure 15B:
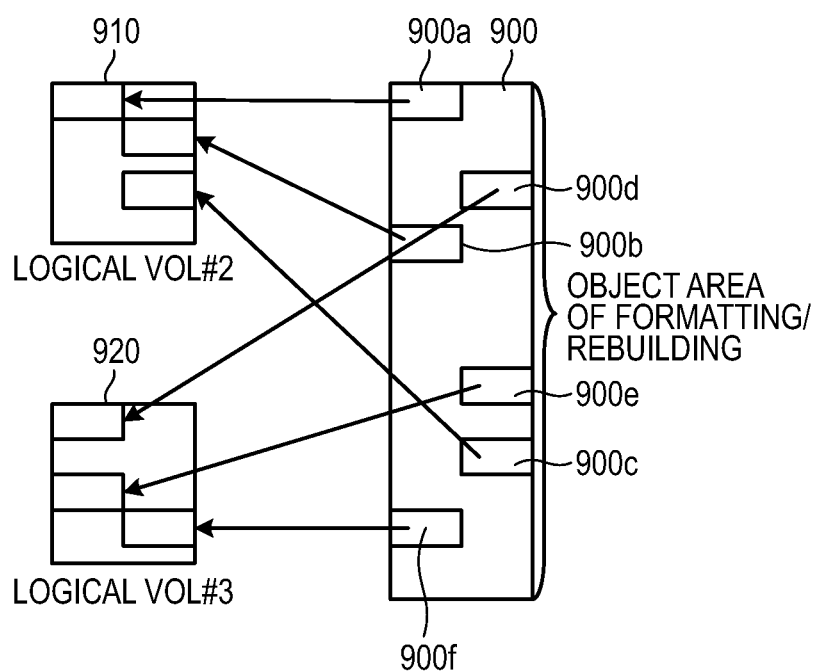

FIG. 14 illustrates the BAD data creation identifying process.

To begin with, the storage pool controller 100g identifies whether a RAID group to be an object is for a pool of the storage pool (step S31).

If the RAID group to be an object is not for a pool of the storage pool (No of step S31), create BAD data (step S32). Then, shift to a step S36.

Meanwhile, if the RAID group to be an object is for a pool of the storage pool (Yes of step S31), ask the storage pool controller 100g a data allocation state of the TPPS of the error occurrence (step S33).

Then, identify whether data has been allocated to the TPPS of the error occurrence on the basis of a result of asking (step S34).

If data is previously allocated to the TPPS of the error occurrence (Yes of step S34), perform the BAD data creating process so as to create BAD data (step S32).

If no data is allocated to the TPPS of the error occurrence (No of step S34), perform the formatting process so as to create format data (step S35).

Then write the created data to the disk including the TPPS of the error occurrence and the hot spare disk 250 (step S36).

To put it specifically, upon creating the BAD data at the step S32, write the created BAD data to the TPPS in the disk of the local error occurrence and the hot spare disk 250.

Further, upon creating the format data at the step S35, write the created format data to the disk including the TPPS of the error occurrence and the hot spare disk 250. In FIG. 11, e.g., write the format data to the medium error area 210b in the disk 210 and a corresponding area in the hot spare disk 250. Thus, the previously formatted areas 210c and 250a are formed in the disk 210 and in the hot spare disk 250, respectively.

Then, the BAD data creation identifying process ends.

According to the RAID system 1000 described above, if an error occurs in a real area not allocated yet in the storage pool, the control module 100 writes the format data rather than the BAD data.

To put it specifically, a logical configuration for implementing a following flow is provided.

When creating the BAD data, to begin with, check whether the RAID group to which the relevant disk belongs to is a real area for the storage pool. If so, ask whether the relevant area of the real area has been allocated to the logical volume. If not allocated yet, perform the formatting process only for the relevant area.

Thus, a situation in which BAD data exists in the not-allocated-yet area in the storage pool can be certainly prevented.

An initial value can thereby be ensured without receiving a formatting instruction from the host computer 300. Thus, disk resources can be effectively used.

The process of the control module 100 of the embodiment has been described as being applied to an example of the RAID function "RAID 5". The embodiment is not limited to the above, and can be applied to other RAID functions.

The disk controller and the disk control method of the present invention have been explained above on the basis of the embodiment illustrated in the drawings. The present invention is not limited to the above, and the configuration of each of the portions can be replaced by any configuration having a similar function. Further, other optional configurations or steps can be added to the present invention.

Further, any two or more of the configurations (features) of the embodiments described above can be combined with one another for the present invention.

Incidentally, the above processing function can be implemented by a computer. In that case, a program in which processing content of the function of the control module 100 is written is provided. As the computer runs the program, the above processing function can be implemented on the computer. The program in which the processing content is written can be saved in a recording medium that can be read by the computer. As the recording medium that can be read by the computer, a magnetic recording device, an optical disk, a magneto-optical recording medium, a semiconductor memory, etc. are enumerated. As the magnetic recording device, a hard disk device (HDD), a flexible disk (FD), a magnetic tape, etc. are enumerated. As the optical disk, a DVD (Digital Versatile Disc), a DVD-RAM (Random Access Memory), a CD-ROM (Compact Disc Read Only Memory), a CD-R (Recordable)/RW (ReWritable), etc. are enumerated. As the magneto-optical recording medium, an MO (Magneto-Optical disk), etc. are enumerated.

In order to distribute the program, a portable recording medium such as a DVD or a CD-ROM on which the program is recorded is on the market. Further, the program can be saved in a storage device of a server computer, so that the program is transferred to another computer through a network.

A computer which runs the disk control program has the program, e.g., recorded on the portable recording medium or transferred from the server computer, saved in an own storage device. Then, the computer reads the program from the own storage device so as to perform a process in accordance with the program. Incidentally, the computer can read the program directly from the portable recording medium so as to perform the process in accordance with the program. Further, every time the program is transferred from the server computer, the computer can perform the process one by one in accordance with the received program.

According to the disclosed disk controller, data of an uncertain value can be prevented from being created in a not-allocated-yet area in the storage pool for performing the rebuilding process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A disk controller to control a plurality of disk devices to store redundant data distributed there across, the disk devices providing at least one logical volume across the disk devices, the disk devices including a plurality of pool volumes allocatable to one of the logical volumes in accordance with an access from a host to the logical volume, the disk controller comprising:
   a memory to store information indicating a relationship between the pool volumes and the logical volume, the information used to allocate the pool volumes to the logical volume when a real area of the pool volumes used for the logical volume is not previously allocated to a logical volume before a host makes a request; and
   a processor to perform data reconstruction in accordance with a failure of the disk devices, a process of the data reconstruction including reading data from a plurality of the pool volumes included in the other disk devices, the processor configured to execute:
      detecting an error in a part of the pool volumes included in the other disk devices when the processor reads data from the pool volumes;
      determining whether the pool volume in which the error is detected is allocated to the logical volume or not in reference to the information; and
      formatting the part of the pool volume in which the error is detected when the pool volume in which the error is detected is unallocated to the logical volume in accordance with the information.

2. The disk controller according to claim 1, wherein when the processor detected the error in the part of the pool volume in which the error is detected, the processor determines whether the pool volume in which the error is detected is allocated to the logical volume or not.

3. The disk controller according to claim 2, wherein when the pool volume in which the error is detected is allocated to the logical volume, the processor controls to write, to the part of the pool volume in which the error is detected, data indicating that the pool volume in which the error is detected is unavailable.

4. The disk controller according to claim 1, wherein an operation in the initialization of the pool volume comprises:
   requesting the disk device including the pool volume in which the error is detected to perform a process for causing the part of the pool volume in which the error is detected to be writable and readable; and
   formatting the part of the pool volume in which the error is detected.

5. A method to control a plurality of disk devices to store redundant data distributed there across, the disk devices providing at least one logical volume across the disk devices, the disk devices including a plurality of pool volumes allocatable to one of the logical volumes in accordance with an access from a host to the logical volume, the method comprising:
   reconstructing data in accordance with a failure of the disk devices, a process of the data reconstruction including reading relationship information from a plurality of the pool volumes included in the other disk devices and the relationship information is usable to allocate the pool volumes to the logical volume when a real area of the pool volumes used for the logical volume is not previously allocated to a logical volume before a host makes a request;
   detecting an error in a part of the pool volumes when a processor reads data from the pool volumes included in the other disk devices;
   determining whether the pool volume in which the error is detected is allocated to the logical volume or not in by referencing the relationship information; and
   formatting the part of the pool volume in which the error is detected when the pool volume in which the error is detected is unallocated to the logical volume in accordance with the relationship information.

6. The method according to claim 5, wherein when the pool volume in which the error is detected is allocated to the logical volume, the processor controls to write, to the part of the pool volume in which the error is detected, data indicating that the pool volume in which the error is detected is unavailable.

7. A non-transitory computer readable medium to control a plurality of disk devices, comprising:
   storing information indicating a relationship between pool volumes and logical volumes, the information is usable to allocate the pool volumes to the logical volume when a real area of the pool volumes used for the logical volume is not previously allocated to a logical volume before a host makes a request; and
   formatting a part of the pool volume in which an error is detected in accordance with the information when the information indicates that the pool volume in which the error is detected is unallocated to the logical volume.

8. The non-transitory computer readable medium according to claim 7, comprising:
   performing data reconstruction in accordance with a failure of the disk devices, a process of data reconstruction including reading data from a plurality of the pool volumes included in other disk devices.

9. The non-transitory computer readable medium according to claim 8, comprising:
   detecting an error in a part of the pool volumes included in the other disk devices when reading the data from the pool volumes included in the other disk devices.

10. The non-transitory computer readable medium according to claim 8, comprising:
    determining whether the pool volume in which the error is detected is allocated to the logical volume or not in reference to the stored information.

11. The non-transitory computer readable medium according to claim 9, comprising:
    initializing the part of the pool volume in which the error is detected when the pool volume in which the error is detected is unallocated to the logical volume.

* * * * *

UNITED STATES PATENT AND TRADEMARK OFFICE
CERTIFICATE OF CORRECTION

PATENT NO. : 8,578,206 B2
APPLICATION NO. : 12/816886
DATED : November 5, 2013
INVENTOR(S) : Chikashi Maeda et al.

Page 1 of 1

It is certified that error appears in the above-identified patent and that said Letters Patent is hereby corrected as shown below:

In the Claims

In Column 13, Line 35, In Claim 5, after "not" delete "in".

Signed and Sealed this
Eleventh Day of February, 2014

Michelle K. Lee
*Deputy Director of the United States Patent and Trademark Office*